(12) United States Patent
Rochau

(10) Patent No.: US 11,172,342 B2
(45) Date of Patent: Nov. 9, 2021

(54) SYSTEMS AND METHODS FOR STEERING WIRELESS NETWORK TRAFFIC WITHIN A VEHICLE

(71) Applicant: Systems and Software Enterprises, LLC, Brea, CA (US)

(72) Inventor: Andreas Rochau, Brea, CA (US)

(73) Assignee: Safran Passenger Innovations, LLC, Brea, CA (US)

(*) Notice: Subject to any disclaimer, the term of this patent is extended or adjusted under 35 U.S.C. 154(b) by 199 days.

(21) Appl. No.: 15/895,926

(22) Filed: Feb. 13, 2018

(65) Prior Publication Data
US 2018/0234823 A1  Aug. 16, 2018

Related U.S. Application Data

(60) Provisional application No. 62/458,930, filed on Feb. 14, 2017.

(51) Int. Cl.
*H04W 4/42* (2018.01)
*G06K 7/00* (2006.01)
(Continued)

(52) U.S. Cl.
CPC ............ *H04W 4/42* (2018.02); *G06K 7/00* (2013.01); *H04W 36/22* (2013.01); *H04W 88/08* (2013.01);
(Continued)

(58) Field of Classification Search
CPC .......... H04W 4/42; H04W 4/02; H04W 4/80; H04W 36/22; H04W 88/08; H04W 84/10; G06K 7/00
(Continued)

(56) References Cited

U.S. PATENT DOCUMENTS

| 7,091,827 B2* | 8/2006 | Stilp | G06K 7/0008 |
| | | | 340/10.1 |
| 7,212,122 B2* | 5/2007 | Gloekler | G01S 19/42 |
| | | | 340/10.1 |

(Continued)

FOREIGN PATENT DOCUMENTS

| CN | 103442413 A | 12/2013 |
| EP | 1561308 B1 | 10/2010 |

(Continued)

OTHER PUBLICATIONS

European Patent Office, Extended European Search Report, dated Aug. 18, 2020.

*Primary Examiner* — Jinsong Hu
*Assistant Examiner* — Rui M Hu
(74) *Attorney, Agent, or Firm* — Umberg Zipser LLP; Ryan Dean

(57) ABSTRACT

System and methods are described herein for automatically associating one or more passenger mobile devices with one or more specific wireless access points depending on each passenger location within the aircraft or other vehicle, and the status of each of the wireless access points including its functionality and load. In preferred embodiments, a tag can be captured or read by the passenger's device, which can then cause the passenger's device to connect with a specific wireless access point. In some embodiments, the passenger's device can also be automatically directed to a landing page, such as using a web browser of the passenger's device.

20 Claims, 5 Drawing Sheets

(51) Int. Cl.
  *H04W 88/08* (2009.01)
  *H04W 36/22* (2009.01)
  *H04W 4/80* (2018.01)
  *H04W 4/02* (2018.01)
  *H04W 84/10* (2009.01)
(52) U.S. Cl.
  CPC ............ *H04W 4/02* (2013.01); *H04W 4/80* (2018.02); *H04W 84/10* (2013.01)
(58) Field of Classification Search
  USPC .................................................. 455/41.1–41.3
  See application file for complete search history.

(56) References Cited

U.S. PATENT DOCUMENTS

| | | | | |
|---|---|---|---|---|
| 7,323,991 | B1* | 1/2008 | Eckert | G07C 9/28 340/572.1 |
| 7,680,454 | B2* | 3/2010 | Mori | H04B 7/18506 455/41.2 |
| 8,111,153 | B2* | 2/2012 | Kim | G08G 1/164 340/539.13 |
| 8,244,209 | B2 | 8/2012 | Harvey et al. | |
| 8,253,538 | B1* | 8/2012 | Chu | G06K 7/10475 340/8.1 |
| 8,693,455 | B2* | 4/2014 | Shoarinejad | H04W 76/40 370/338 |
| 8,731,583 | B2* | 5/2014 | Wengrovitz | H04W 4/80 455/456.3 |
| 8,806,521 | B2 | 8/2014 | Keen et al. | |
| 8,897,770 | B1 | 11/2014 | Frolov et al. | |
| 9,088,862 | B2* | 7/2015 | Jalkanen | H04W 4/80 |
| 9,119,166 | B1* | 8/2015 | Sheikh | H04L 51/38 |
| 9,253,589 | B2* | 2/2016 | McCann | H04W 4/80 |
| 9,282,530 | B1* | 3/2016 | Couleaud | H04W 24/08 |
| 10,049,241 | B2* | 8/2018 | Montalvo | G06K 7/0008 |
| 2002/0173883 | A1* | 11/2002 | Ezaki | G06Q 10/02 701/3 |
| 2002/0196126 | A1* | 12/2002 | Eisenberg | G06K 19/07796 340/10.2 |
| 2005/0035873 | A1* | 2/2005 | Kimura | G08C 23/04 340/12.51 |
| 2005/0134461 | A1* | 6/2005 | Gelbman | G06K 17/00 340/572.8 |
| 2005/0215265 | A1* | 9/2005 | Sharma | H04L 47/125 455/453 |
| 2006/0203838 | A1* | 9/2006 | Howard | G01V 15/00 370/449 |
| 2007/0176745 | A1* | 8/2007 | Gibson | H04W 88/02 340/10.1 |
| 2008/0180246 | A1* | 7/2008 | Malik | G06K 7/10356 340/572.1 |
| 2010/0079237 | A1* | 4/2010 | Falk | H04L 63/0492 340/5.8 |
| 2012/0208461 | A1* | 8/2012 | Choi | H04L 67/16 455/41.2 |
| 2012/0221695 | A1* | 8/2012 | Rose | G07C 9/27 709/223 |
| 2013/0074108 | A1 | 3/2013 | Cline et al. | |
| 2013/0102248 | A1* | 4/2013 | Jay | H04W 4/029 455/41.1 |
| 2013/0237148 | A1* | 9/2013 | McCann | H04W 4/80 455/41.1 |
| 2013/0290707 | A1* | 10/2013 | Sinclair | H04L 9/3226 713/161 |
| 2014/0111313 | A1* | 4/2014 | Wild | H04W 48/20 340/10.42 |
| 2014/0118113 | A1* | 5/2014 | Kaushik | G01S 5/0231 340/8.1 |
| 2014/0208370 | A1* | 7/2014 | Hatakeyama | H04N 21/61 725/76 |
| 2015/0097036 | A1* | 4/2015 | Oh | G06Q 20/208 235/462.41 |
| 2015/0205991 | A1* | 7/2015 | Park | H04W 4/42 340/10.3 |
| 2016/0021091 | A1* | 1/2016 | Hoyer | H04L 67/02 726/9 |
| 2016/0095045 | A1* | 3/2016 | Salomon | H04W 4/42 455/411 |
| 2016/0128015 | A1* | 5/2016 | McCann | H04W 48/10 370/338 |
| 2016/0212618 | A1* | 7/2016 | Henzl | H04L 63/18 |
| 2016/0311348 | A1 | 10/2016 | Watson et al. | |
| 2017/0013545 | A1 | 1/2017 | Ma | |
| 2017/0078834 | A1* | 3/2017 | Anderson | H04W 12/082 |
| 2017/0220312 | A1* | 8/2017 | Lee | H04L 12/1818 |
| 2017/0310543 | A1* | 10/2017 | Greig | H04N 21/2146 |
| 2018/0018621 | A1* | 1/2018 | Notohardjono | H04W 4/80 |
| 2018/0063260 | A1* | 3/2018 | Pei | G06K 7/10128 |
| 2018/0115900 | A1* | 4/2018 | Defrance | H04W 4/80 |
| 2018/0206185 | A1* | 7/2018 | Xu | H04W 12/06 |
| 2018/0302188 | A1* | 10/2018 | Ciholas | H04W 56/002 |

FOREIGN PATENT DOCUMENTS

| | | |
|---|---|---|
| EP | 2534607 B1 | 9/2015 |
| WO | 2015044677 A1 | 4/2015 |

* cited by examiner

SYSTEMS AND METHODS FOR STEERING WIRELESS NETWORK TRAFFIC WITHIN A VEHICLE

This application claims priority to U.S. provisional application having serial no. 62/458,930 filed on Feb. 14, 2017. This and all other referenced extrinsic materials are incorporated herein by reference in their entirety. Where a definition or use of a term in a reference that is incorporated by reference is inconsistent or contrary to the definition of that term provided herein, the definition of that term provided herein is deemed to be controlling.

FIELD OF THE INVENTION

The field of the invention is systems and methods for steering wireless network traffic within an enclosed space to designated wireless access points.

BACKGROUND

The background description includes information that may be useful in understanding the present invention. It is not an admission that any of the information provided herein is prior art or relevant to the presently claimed invention, or that any publication specifically or implicitly referenced is prior art.

Use of wireless transceivers for provision of cell phone services, data services, and entertainment content within aircraft is becoming more frequent, as such systems can support mobile devices (for example, smart phones) as well as reduce aircraft weight when used to provide content to in-flight entertainment systems. Typical installations utilize a large number of wireless access points in order to ensure service throughout the aircraft. Due to the relatively small area over which these wireless access points are deployed and the tendency of wireless signals to reflect within the aircraft cabin, the association between passenger wireless devices and the wireless access points can be essentially random. This random association leads to network inefficiency and potential performance issues due to uneven load balancing.

For example, European Patent No. 1561308 to Marston et al. describes a system where a number of wireless access points are provided that each serves different seat areas. The wireless access points operate on different frequencies, with undisclosed load balancing software used to optimize performance. Such a system, however, is necessarily limited by the number of available frequencies.

Thus, there is still a need for systems and methods that permit economical and effective localization of mobile transmitters within an aircraft.

SUMMARY OF THE INVENTION

The inventive subject matter provides apparatus, systems and methods in which a system automates the assignment and registration of a user device to a specific wireless access point (WAP) in a vehicle. This assignment is at least partially based on a tag or location marker scanned by the user's device. The specific tag or location marker can be pre-associated to a specific WAP to ensure proper load balancing of the plurality of WAPs within the aircraft or other vehicle.

It is also contemplated that the specific WAP associated with one or more tags or location markers can be updated over time, either manually or dynamically by the system. For example, the specific WAP could be updated due to a malfunction of one of the plurality of WAPs, which necessitates that a user's device be associated with a different WAP within the vehicle. In addition, association with a different WAP could occur to ensure proper load balancing of the system. This could be, for example, by associating newly registered devices with a different WAP, or re-associating existing user devices on the system with a different WAP. Regardless, the goal and purpose of the invention(s) stated herein is to greatly simplify the process required by a user to access a WAP.

In still further embodiments, it is contemplated that the system can cause a web browser or other application on the user's device to automatically open and be directed to a landing page. The landing page could be used to present information to the user, or complete registration when needed.

Thus, using the systems and methods contemplated herein, a user could scan a tag or location marker using the user's device. Based on the tag/marker scanned, the user's device can be automatically associated/registered with a specific WAP within the vehicle, and the user's device can then automatically present a landing page via a web browser or other application installed on the user's device. This eliminates the need for a user to access system settings on the user's device and connect to a WiFi network, for example. In addition, a user would no longer need to access a specific website to access a portal for the wireless network, in-flight entertainment offerings, and so forth.

Various objects, features, aspects and advantages of the inventive subject matter will become more apparent from the following detailed description of preferred embodiments, along with the accompanying drawing figures in which like numerals represent like components.

DETAILED DESCRIPTION

Throughout the following discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

The inventive subject matter provides apparatus, systems and methods in which location markers or tags that include information related to their location are distributed within the aircraft. Passenger devices can interrogate a nearby tag (for example, by acquiring and processing an image of the tag) or otherwise obtain location information from a nearby tag in order to determine their location. Subsequently, the passenger device's location can be used to determine which wireless access point should be utilized by or assigned to the passenger's device.

Figure 1:
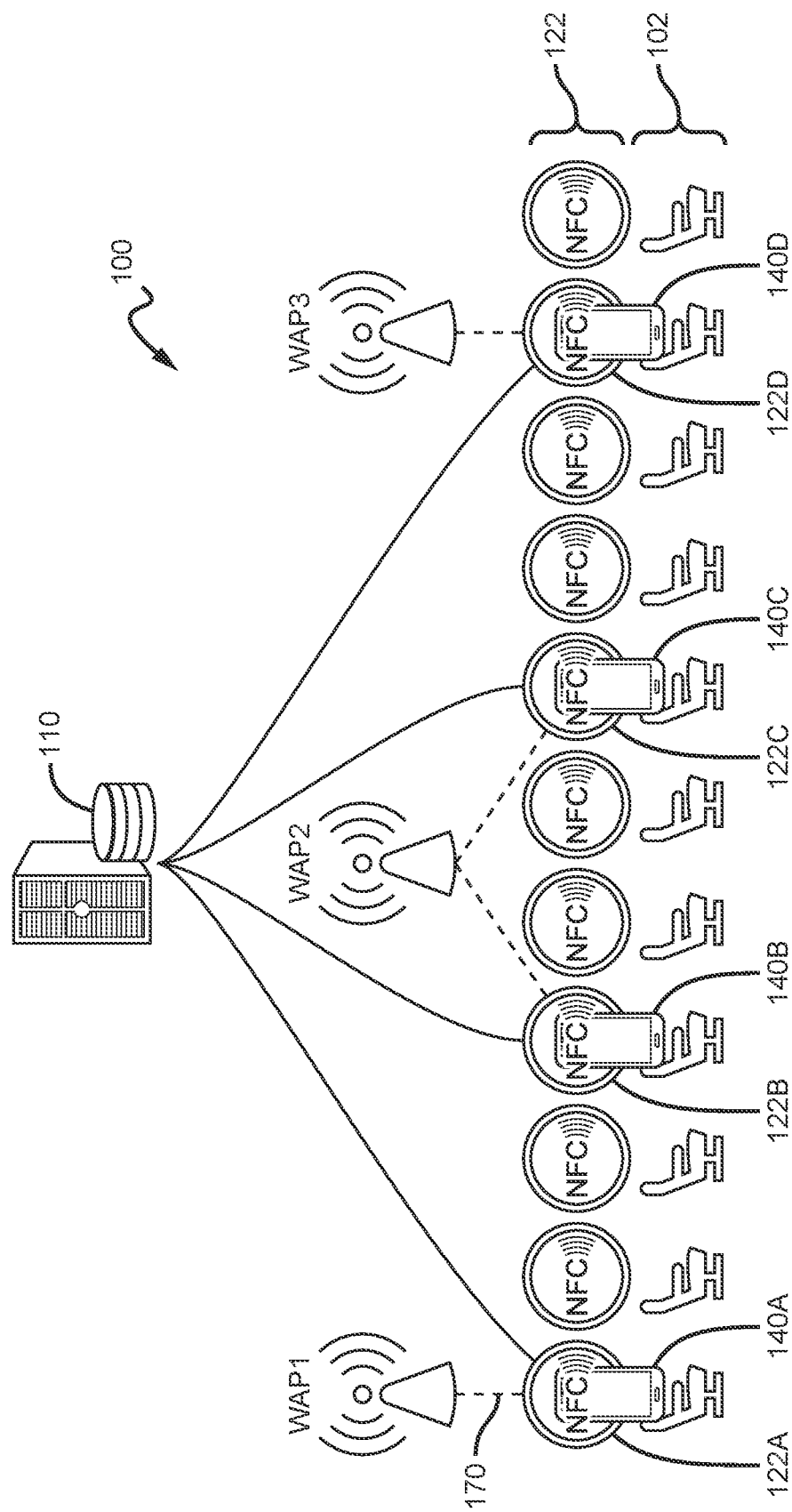
FIG. 1 illustrates a schematic of one embodiment of a system for automatically associating mobile devices with wireless access points.

FIG. 1 illustrates one embodiment of a system 100 for associating a mobile device with a wireless access point. As shown, the system 100 can include a plurality of wireless access points (here, WAP1, WAP2, WAP3), and the specific number of WAPs will depend on the configuration of the aircraft or other vehicle. Although the below discussion is focused on the use of WAPs in an aircraft, it is contemplated that the systems and methods described herein could be used in other vehicles including, for example, busses, trains, cars, and boats.

System 100 can further include a server 110 configured to manage the association of the mobile devices with the WAPs.

In some embodiments, each seat within an aircraft can contain a unique identifying tag or location marker. However, in other contemplated embodiments, groups of seats (for example, one or more rows of seats) can include a common identifying tag or marker for that group, marking them as members of a group associated with a particular WAP. In such embodiments, it is contemplated that there could still be a tag or marker at each seat for ease of use by a passenger, or could be a shared tag or marker for two or more seats.

In still other embodiments, a single tag or marker could be provided that serves to indicate the position of a group of seats. For example, a single tag or marker could be provided at the entrance to a row or similar subset of seats at a position that is convenient for scanning be each passenger upon being seated. Or the tag or marker could be placed near the row's ventilation and light control, if present.

Suitable tags or markers can include, for example, location-specific indicia, such as one or two dimensional bar codes and/or machine or human-readable text. However, markers could also include a unique shape/color combination or other indicia that is readily recognizable and unique by the system 100. Where the tag or marker comprises a bar code or other camera capturable indicia, it is contemplated that the tag or marker could be a physical element that is disposed on the seatback, tray table, arm rest, etc., above the seat, or so forth. However, in other embodiments, it is contemplated that the tag or marker could be displayed on a display of the in-flight entertainment system, especially where the in-flight entertainment system has displays present at most, if not all, of the seats. This would advantageously allow for the indicia to change over time in order to associate a user's mobile device with the appropriate WAP, for example, and obviously would not eliminate the need to replace the indicia due to wear and tear, for example.

Information from such tags can be obtained by acquiring an image of the tag such as by using a camera on the mobile device, and then applying a suitable bar code or optical character recognition software to the image. Alternatively, a suitable tag/marker can have a readily identifiable shape, color, and/or pattern that can be identified using image processing software, with location information derived from comparison of the characteristics of the tag/marker to a stored database of such characteristics and locations. In still other embodiments, a readily identifiable feature or set of features within the aircraft, for example a cabin door, juxtaposition of a set of seats with a bulkhead, kitchen area, etc. can be used as a location tag. In such embodiments, a photograph of such features can be analyzed using image analysis software to determine distance and angle from identifiable features within the image, thereby permitting determination of the position within the aircraft where the image was obtained.

Still further, it is contemplated that the indicia could be disposed on a user's boarding pass, whether printed or digital.

After photographing or otherwise scanning/capturing a tag or marker, the mobile device can utilize information conveyed by the tag to identify the appropriate wireless access point. For example, a bar code tag can encode a particular address or access code associated with the appropriate wireless access point. Similarly, machine readable text associated with a tag can provide such an address or access code through the use of an optical character recognition algorithm. Such an address can be supplied to the mobile device's operating system for identification of and establishment of a link to the appropriate wireless access point.

Alternatively, an application or browser address can be provided on the mobile device that permits the device to associate information obtained by scanning or photographing a tag with a specific location or region within the aircraft. For example, an application of the mobile device can associate an image of a tag having a particular color, shape, and/or pattern with stored location data (for example, a red circular tag can be associated with a stored, specified set of seat rows). Subsequently such location data can be associated with a particular address or access code for a wireless access point proximal to this location, which can be supplied to the mobile device's operating system.

In the example shown in FIG. 1, an aircraft comprises a plurality of seats 102 and the system comprises three (front, middle, and rear) wireless access points WAP1, WAP2, WAP3. In some embodiments, it is contemplated that the range of each of the WAPs may overlap with a neighboring WAP, while in other embodiments it is contemplated that the ranges do not overlap. A mobile device within the aircraft is identified as being within either the front, middle or rear region. If identified as being within the front region, the mobile device associates itself with WAP1. If identified as being within the middle region, the mobile device associates itself with the middle WAP2. If identified as being within the back region, the mobile device associates itself with the rear WAP3.

As shown in FIG. 1, each of the seats 102 or rows of seats can have one or more near-field communication tags 122. Of course, any of the indicia described above could alternatively be used; however, NFC tags or similar tags are preferred due to the reduced number of steps required for a user to interact with system 100.

For example, a user's mobile device 140A can be placed near the NFC tag 122A. This permits the device's NFC reader to obtain information stored on the NFC tag 122A. Based on the information received, the mobile device 140A can utilize information conveyed by the NFC tag 122A to identify the appropriate WAP with which to associate. In this instance, mobile device 140A is instructed to register with WAP1 as shown by dashed line 170. After reading the NFC tag 122A, the mobile device 140A can automatically be caused navigate to a specific website or landing page, or open a specific application, for example.

In a similar vein, mobile devices 140B and 140C can be placed near a NFC tag 122B or 122C, which then causes them to connect with WAP2 and preferably load a landing page on the mobile devices 140B and 140C. Likewise, mobile device 140D can be placed near NFC tag 122D, and then automatically register with WAP3.

In some embodiments, to determine which of the WAPs to associate with, the mobile device can contact server 110 after capturing or reading the tag to provide some or all of the information received or present in the tag to the server 110, which can then provide the WAP information for automatic connection of the mobile device to the specific WAP. This could be, for example, a lookup of the WAP in a table based on the information provided.

In one aspect, a method for associating a mobile device with a wireless access point is contemplated. The method comprises providing a set of WAPs within a vehicle including at least a first WAP, and preferably at least first and second WAPs. Where more than one WAP is provided, it is contemplated that each WAP can be disposed within the vehicle to service a different portion of the vehicle. Thus, for example, a first WAP can service a first region and a second WAP can be configured to service a second region.

A plurality of tags can be provided in the vehicle, where a first tag can be associated with a first region or WAP, and a second tag can be associated with a second region or WAP. As discussed above, the tag can comprise a NFC tag, a barcode, machine-readable text, or other indicia, or other information that can be captured or read by the mobile device.

Information specific to the first or second tag can be acquired by a mobile device, and the mobile device can then be automatically registered with a WAP in the vehicle based on the information obtained from the tag. Where there are multiple WAPs and devices, it is contemplated that a first mobile device can be assigned to a first WAP when the first tag is identified/read, and a second mobile device can be assigned to a second WAP when the second tag is identified/read.

Figure 2A:
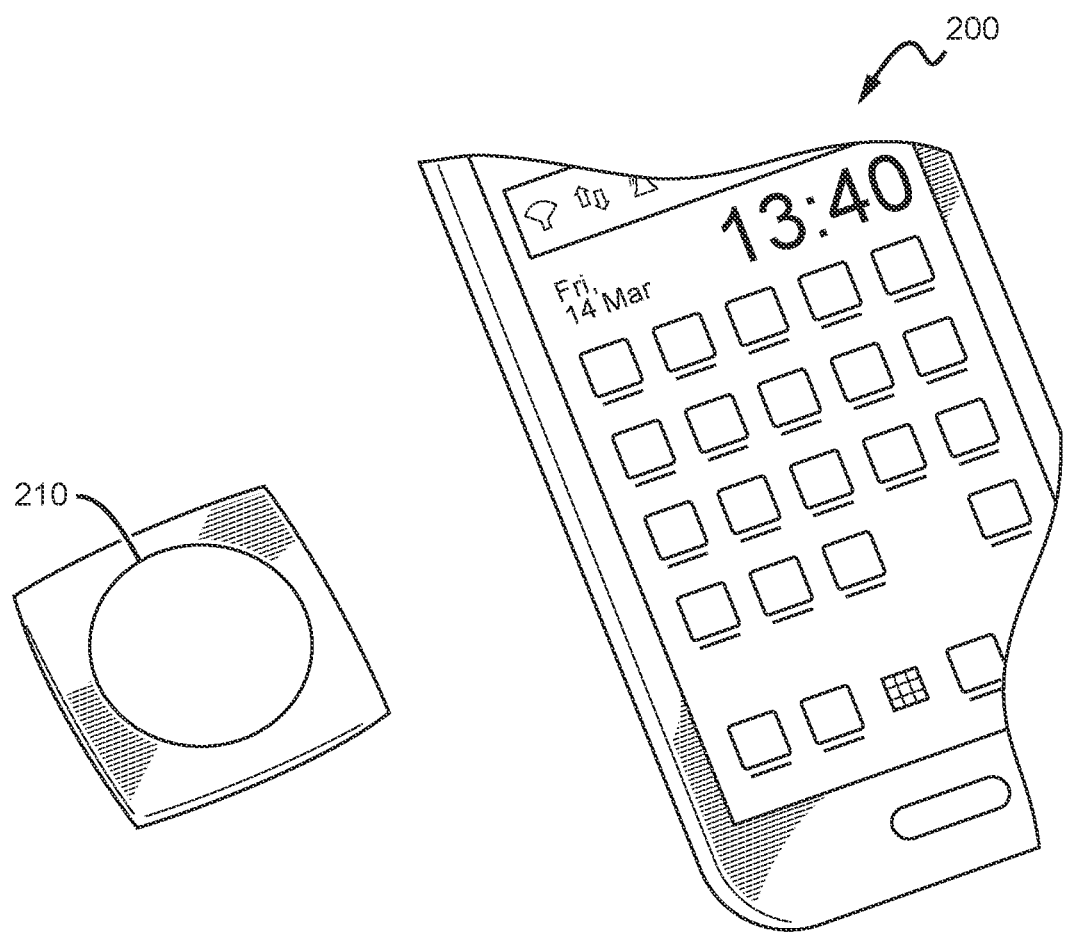
FIGS. 2A-2D illustrate various steps of one embodiment of a method for automatically associating a mobile device with a wireless access point.
Figure 2B:
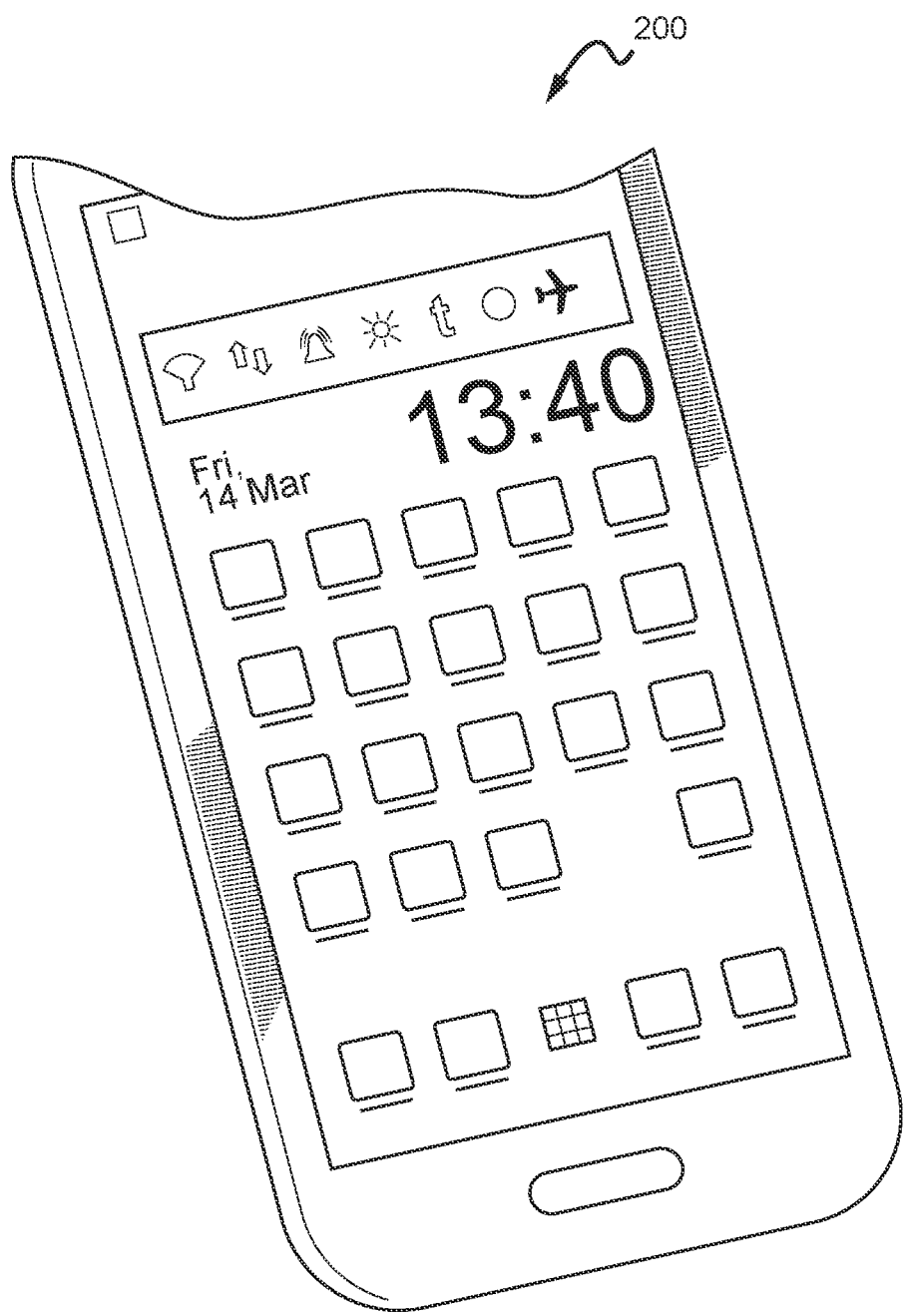

As shown in FIG. 2A-2D, a mobile device 200 of a passenger, for example, can read a NFC tag 210 by moving the mobile device nearby the NFC tag 210 (shown in FIG. 2B where the mobile device 200 is placed over the NFC tag 210). This allows the mobile device 200 to read the NFC tag 210 and obtain information from the tag 210.

Figure 2C:
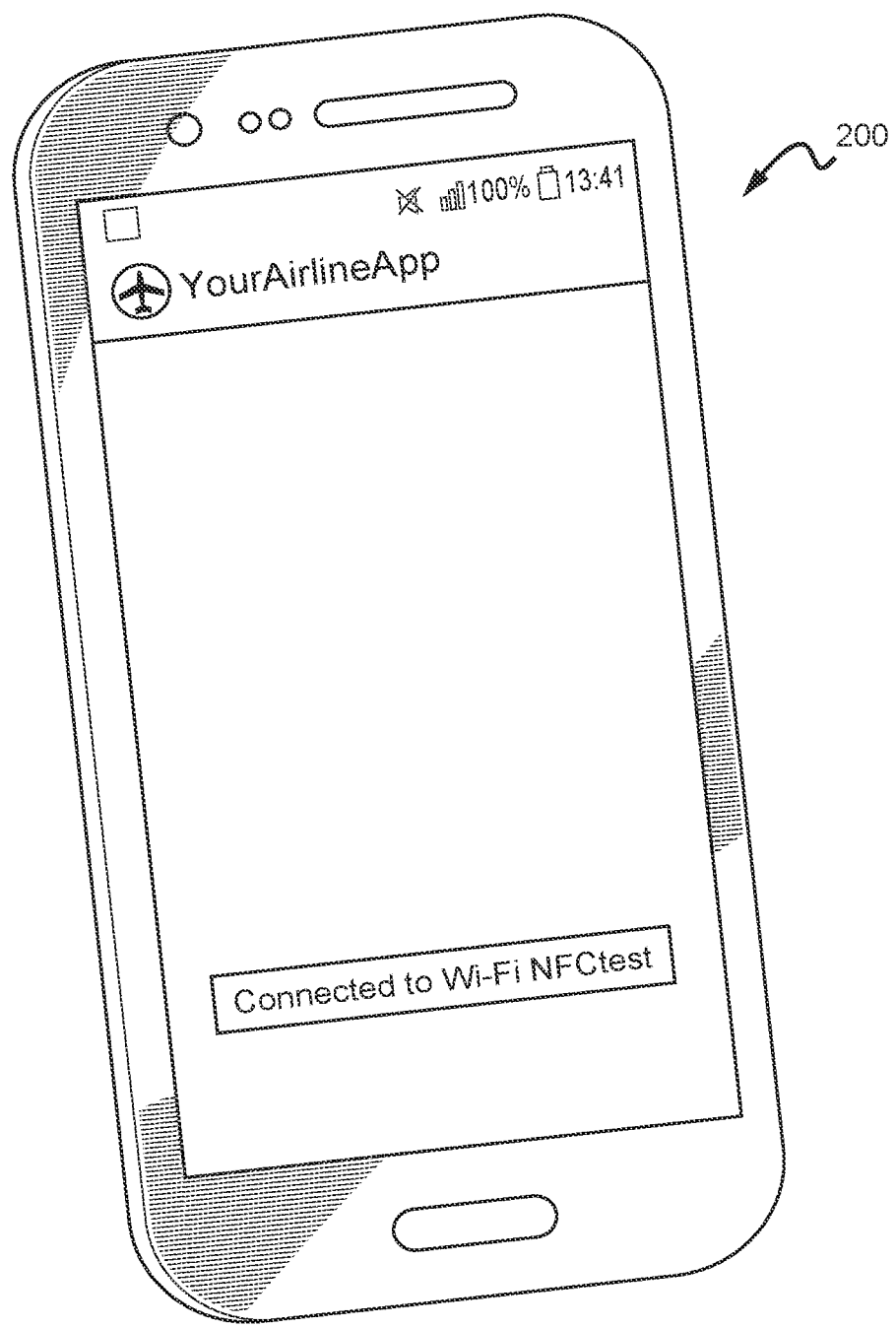

After the NFC tag 210 is read by the mobile device 200, a web browser or other application can be opened on the mobile device 200, as shown in FIG. 2C. The mobile device 200 is also connected to the specific WAP associated with the tag 210. This can be accomplished by communicating with a server that then directs the mobile device to connect with a specific WAP.

Figure 2D:
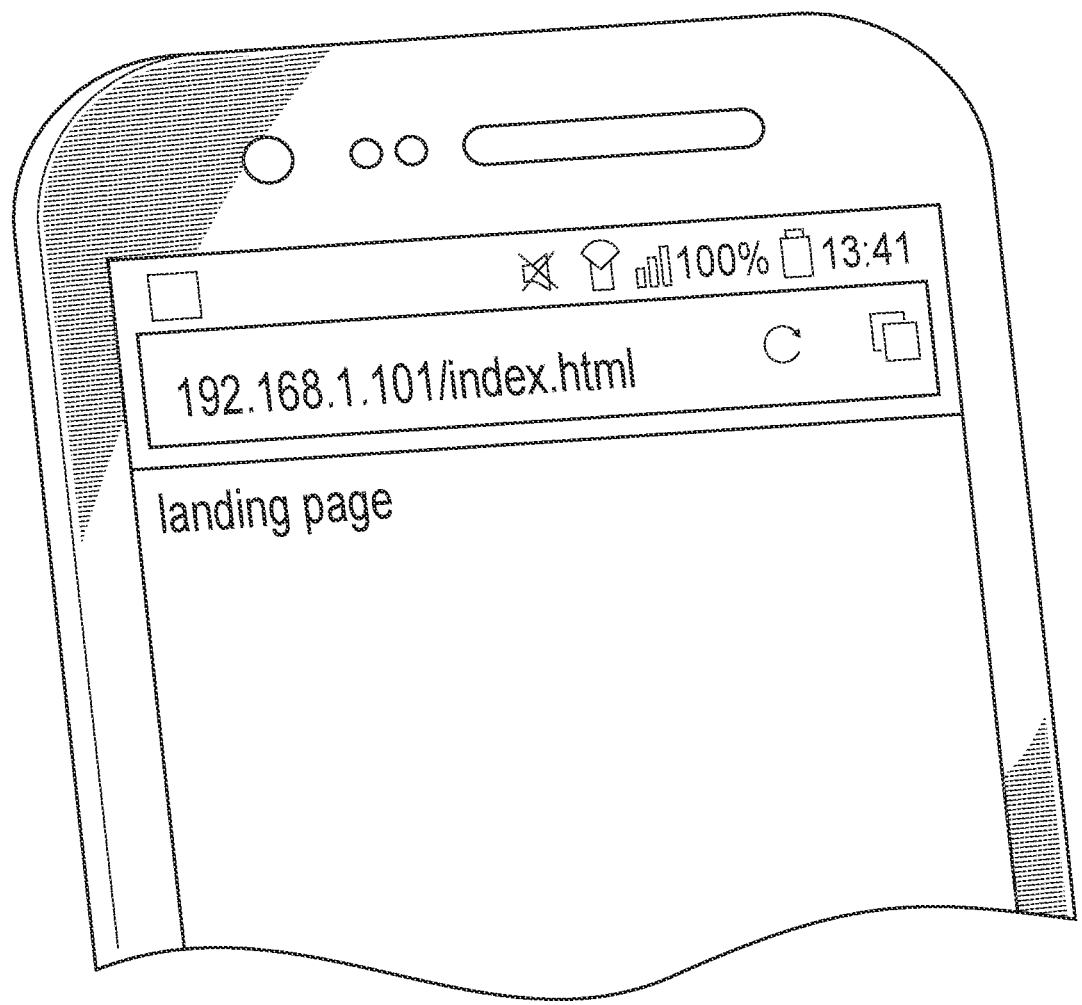

Once connected, the mobile device can then be automatically directed to landing page as shown in FIG. 2D.

The systems and methods described above vastly simplify the current process required for connecting to an aircraft's wireless network. In many cases, a user must first access a device's wireless settings to locate and connect with a vehicle's wireless network. Then, after connection with the network, the user must navigate to a specific website or open a specific application to begin utilizing the network connection. These many steps are eliminated by the present invention, in which a user can simply read a tag, which then causes the user's mobile device to automatically communicate with the server as needed, and connect with a specific WAP, while preferably also loading a landing page.

Apart from simplifying the user's experience, the inventive subject matter also helps to ensure that loads on each of the WAPs are balanced so that a single WAP is not overloaded by connections from users' devices. This is possible through automatic direction and redirection of mobile devices to particular WAPs depending on location of the passenger, accessibility of the WAP to the passenger, and the current and expected load of the WAP, for example.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value with a range is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method for automatically associating a mobile device with a wireless access point (WAP) within a vehicle, comprising:
    providing a first wireless access point and a second wireless access point disposed within the vehicle, wherein the first wireless access point is configured to service a first region of the vehicle and the second wireless access point is configured to service a second region of the vehicle;
    providing first and second tags at distinct locations within the first region of the vehicle, wherein the first and second tags comprise a first identifying tag, and wherein each of the first and second tags is associated with the first region, and wherein the first and second tags are identical, and wherein the first and second tags encode a first access code of the first wireless access pant;
    providing third and fourth tags at distinct locations within the second region of the vehicle, wherein the third and fourth tags comprise a second identifying tag that is distinct from the first identifying tag, and each of the third and fourth tags is associated with the second region, and wherein the third and fourth tags encode a second access code of the second wireless assess point;
    acquiring information from one of the first, second, third or fourth tags using the mobile device; and
    automatically associating and registering the mobile device with (i) the first WAP if the mobile device acquired information from the first or second tag, or (ii) the second WAP if the mobile device acquired information from the third or fourth tag.

2. The method of claim 1, further comprising automatically loading a landing page on a display of the mobile device after the device is connected with the first WAP.

3. The method of claim 1, further comprising providing a plurality of tags within the vehicle, wherein each of the tags is present on a display screen of a seat display unit located at a specific seat within the vehicle, and wherein the plurality of tags comprises the first and second tags, and wherein at least one of the first and second tags changes over time on the display screen, such that the at least one of the first and second tags is pre-associated with a different wireless access point.

4. The method of claim 1, further comprising the mobile device communicating with a server and transmitting at least some of the acquired information from the first tag to the server, and receiving a command that instructs the mobile device to connect with the first WAP.

5. The method of claim 1, wherein the first or third tag comprises a near-field communication (NFC) tag, and wherein the mobile device comprises a NFC reader.

6. The method of claim 1, wherein the first or third tag comprises a barcode or other indicia.

7. The method of claim 1, wherein the first tag comprises a first shape, color, or pattern identifiable by image analysis software and the third tag comprises a second shape, color, or pattern identifiable by image analysis software, and wherein the first tag and the third tag are distinguishable from one another.

8. The method of claim 1, wherein the first tag comprises a first set of one or more interior features of an aircraft cabin and the third tag comprises a second set of one or more interior features of the aircraft cabin.

9. The method of claim 1, wherein the first region comprises a first set of one or more rows of seats in an aircraft and the second region comprises a second set of one or more rows of seats in the aircraft.

10. The method of claim 1, wherein information is acquired using a camera associated with the mobile device.

11. The method of claim 1, wherein the step of identification is performed using the mobile device.

12. The method of claim 1, wherein the first and second tags further encode a first address of the first wireless access point, and wherein the third and fourth tags encode a second address of the second wireless access point.

13. A system for automatically associating a mobile device with a wireless access point (WAP) within a vehicle, comprising:
    a vehicle server;
    first and second WAPs communicatively coupled with the vehicle server and disposed within the vehicle;
    a plurality of tags disposed within the vehicle; and
    wherein the server comprises information that associates a specific one of the first and second WAPs with at least some of the plurality of tags, and wherein the at least some of the plurality of tags are identical to one another, and wherein the at least some of the plurality of tags encode a first access code of the first WAP; and wherein the server is configured to transmit information to a mobile device based on information received from the mobile device and that was obtained from a tag of the plurality of tags, and wherein the information causes the mobile device to automatically load a landing page on a display of the mobile device after device is connected with the first or second WAP.

14. The system of claim 13, wherein each of the plurality of tags is disposed at a specific seat within the vehicle.

15. The system of claim 13, wherein each of the plurality of tags comprises a barcode or other indicia.

16. The system of claim 13, wherein each of the plurality of tags comprises machine-readable text.

17. The system of claim 13, wherein each of the plurality of tags comprises a unique shape, color, or pattern identifiable by image analysis software.

18. The system of claim 13, wherein each of the plurality of tags comprises a unique set of one or more interior features of an aircraft cabin.

19. The system of claim 13, wherein each of the plurality of tags comprises a near-field communication (NFC) tag.

20. The method of claim 13, wherein the at least some of the plurality of tags further encode a first address of the first WAP.

* * * * *